Patented Oct. 24, 1933

1,931,847

UNITED STATES PATENT OFFICE 1,931,847

MANUFACTURE OF BENZANTHRONE

Alphons O. Jaeger, Mt. Lebanon, and Lloyd C. Daniels, Crafton, Pa., assignors to The Selden Company, Pittsburgh, Pa., a corporation of Delaware No Drawing. Application August 17, 1929
Serial No. 386,736

4 Claims. (Cl. 260—61)

This invention relates to the manufacture of benzanthrone substances.

In the past benzanthrone has been prepared from relatively pure anthraquinones produced by the chemical oxidation of anthracene or by synthetic processes from phthalic anhydride and benzol. In our co-pending application, Serial No. 380,751, filed July 24, 1929, a process of preparing benzanthrone from catalytic anthraquinone of varying grades of purity is described, based on the discovery that the impurities resulting from the use of impure anthracene in the catalytic oxidation do not exert a harmful influence on the subsequent benzanthrone formation and are even of value since they tend to act as reducing agents in subsequent condensations to produce dibenzanthrone and similar dyestuffs.

Crude synthetic anthraquinone is produced by condensing phthalic anhydride and benzol in the presence of aluminum chloride (the well-known Friedel-Craft's reaction) to form benzoyl benzoic acid which is subsequently condensed to anthraquinone of varying grades of purity by means of concentrated sulfuric acid or oleum. The impurities present in such anthraquinones produced by this method, such as diphenyl-phthalide and 3-phenyl phthalide, are much different both in amount and in composition from those present in anthraquinone produced catalytically, as pointed out in the application referred to.

We have now found that notwithstanding this difference in the impurities present benzanthrone can be produced from impure synthetic anthraquinone. This is quite surprising since from a consideration of the difference in constitution and amounts of the impurities one would naturally anticipate that the impurities would have an objectionable effect on the course of the reaction and on the quality of the reaction product. It has been found, however, that not only can impure anthraquinone be used as stated, but that the derivatives, homologues and analogues of anthraquinone produced by the synthetic method, many of which cannot be obtained by the catalytic oxidation of anthracene substances, can also be used in impure condition in making the corresponding benzanthrone substances by this method, even though these latter are made by the ring closure of ketonic aromatic acids other than orthobenzoyl benzoic acids.

This discovery permits the use of lower grades of raw materials in the preparation of anthraquinones as intermediates for benzanthrone substances which have hitherto not been considered technically usable. For example, it is no longer necessary to use purified phthalic anhydride in the production of the benzoyl benzoic acid substances and expensive purifications of the synthetically produced anthraquinones are unnecessary.

The present invention is not limited to the use of any particular grade of impure synthetic anthraquinone and higher grades of impure anthraquinone produced synthetically from relatively pure materials or by reason of purification process are included in the invention. It should also be understood that the same range of purity applies also to the derivatives of anthraquinone previously mentioned. Most of the impurities in the crude synthetic anthraquinone which are not destroyed by sulfuric acid in the benzanthrone process are solids, and although the benzanthrone reaction is heterogeneous as to phase strange to say the increase in the amount of the solid phase due to the impurities apparently does not affect the reaction injuriously as to yields.

The invention will be described in greater detail in connection with the following specific examples which illustrate the typical embodiments of the invention, but without restricting in any manner the scope thereof.

Example 1

Crude synthetic anthraquinone in amount corresponding to 100 parts of 100% material is dissolved in 1500 to 1800 parts of sulfuric acid of 93-98% concentration. The solution is warmed to 60-65° C. and 40-50 parts of copper dust or aluminum powder are added in small portions while agitating vigorously. The introduction of metal and the cooling of the batch should be so regulated as to prevent the temperature of the batch from being carried above 70° C., and at the same time each portion of metal added must cause a 2-4° C. rise. After all the metal is in, the mixture is held at 65-70° C. until all the copper is dissolved. The batch is then cooled to 15-20° C. and ice is added in small portions using, in all, enough to reduce the concentration of the acid to 87-90%. During this preliminary dilution, the temperature is held under 30° C.

180 to 200 parts of glycerine or the equivalent of glycerine is mixed with enough water to reduce the acid concentration to 80-82%. This mixture is then run into the reduced anthraquinone mixture as fast as it mixes in.

The reaction mixture is heated to 110-115° C. or until a spontaneous rise in temperature ensues at which time the outside heating is stopped and cooling is applied if necessary to prevent the temperature going over 130-135° C. When the temperature tends to drop, outside heating is again applied to hold the temperature at 130-135° C. for a total of 2½-3 hours.

Enough water to reduce the acidity of the batch to 35-40% is heated nearly to boiling in a lead lined vat provided with an agitator. The reaction mixture is then dropped or blown into the water just fast enough to maintain boiling. The dilution is completed with a large bulk of cold water or ice, and the precipitated product is filtered off and washed acid-free. A slight improvement in the quality of the product can be obtained by giving it a wash with boiling weak alkali, for example, a 0.2% solution of sodium carbonate, but the purity of the precipitated product is such that this step is usually unnecessary.

The crude product shows on analysis, a benzanthrone content of 80-85% and the yield is 88-92% of theory. The crude product is directly usable for fusion with caustic alkalies and reducing agents for making dibenzanthrone. The product can also easily be purified by sublimation and fractional condensation at predetermined temperatures of the fractionating chambers in the same manner as crude benzanthrone made from commercially pure anthraquinones.

Example 2

Crude synthetic 2-chloranthraquinone corresponding in amount to 100 parts of 100% material is dissolved in 1800 parts of 95% sulfuric acid. Sufficient ice is added to dilute the acid to 88%. The suspension is cooled to 20° C. or lower and a mixture is run in consisting of 95-100 parts of aniline oil, 200-220 parts of glycerine and enough water to reduce the acid concentration to 80%. The batch is warmed until reaction sets in at about 112-115° C. and the condensation and isolation of the condensation product is continued as specified for making benzanthrone in Example 1.

The crude chlorbenzanthrone is directly suitable for fusion with caustic alkalies and mild reducing agents to make dichlordibenzanthrone. It may be purified by sublimation with fractional condensation.

Example 3

Crude 1, 2-benzanthraquinone corresponding to 100 parts of 100% material is mixed with 180 parts of glycerine and 84-87 parts of aniline oil. 2000 parts of 82-83% sulfuric acid is agitated in a jacketed kettle and the glycerine-anilin-benzanthraquinone mixture added through a small open charging hole in small portions as fast as it mixes with the acid. The mixture is heated slowly until spontaneous reaction sets in at 105-110° C., cooling water being run into the jacket to prevent the reaction from taking the temperature above 115-118° C. When the reaction moderates, outside heat is applied to hold the mixture at 110-112° C. for 5-6 hours.

The product is isolated as in previous examples. The crude material can be used for fusion with caustic potash and reducing agent. Since no accurate method of analysis is as yet available, exact yields are not known, but material of above 180° C. melting point and, therefore, nearly pure can be extracted in amount corresponding to above 80% of theory yield.

Crude synthetic methylanthraquinone, dimethylanthraquinones, methylchloranthraquinones and dichloranthraquinones may be substituted for any of the crude synthetic anthraquinones cited in the above illustrative examples, as also is the case with hydroxyl derivatives and homologues and analogues of anthraquinone other than those mentioned.

Instead of glycerine, acrolein itself or ethers and esters of glycerine or other compounds may be used when they are of such nature as to generate or liberate acrolein by treatment with strong sulfuric acid.

In the claims the term "acrolein-forming substance" is used to cover acrolein and such substances as glycerine, esters of glycerine and other compounds of such nature as to give the necessary acrolein nucleus to form benzanthrone under the reaction conditions used.

Phthalic anhydride is ordinarily produced by the catalytic oxidation of naphthalene and in its commercial production the product from the converter is quite impure and is purified by fractional condensation at predetermined temperatures in a number of condensing chambers. The term "converter product" is used to define the product which is obtained from the phthalic anhydride converter without such fractional condensation.

What is claimed as new is:

1. A method of producing a benzanthrone substance which comprises producing impure anthraquinone from impure phthalic anhydride and benzol by the Friedel-Craft reaction and subjecting the impure product so obtained to condensation with an acrolein-forming substance in the presence of a condensing agent.

2. A method of producing a benzanthrone substance which comprises producing impure anthraquinone from impure phthalic anhydride and benzol by the Friedel-Craft reaction and subjecting the impure product so obtained to reduction not materially beyond the anthranol stage in a sulfuric acid solution and without isolating the product subjecting the mixture to condensation with an acrolein-forming substance.

3. A method of producing a benzanthrone substance which comprises producing impure anthraquinone from phthalic anhydride converter product and benzol by the Friedel-Craft reaction and subjecting the impure product so obtained to condensation with an acrolein-forming substance in the presence of a condensing agent.

4. A method of producing a benzanthrone substance which comprises producing impure anthraquinone from phthalic anhydride converter product and benzol by the Friedel-Craft reaction and subjecting the impure product so obtained to reduction not materially beyond the anthranol stage in a sulfuric acid solution and without isolating the product subjecting the mixture to condensation with an acrolein-forming substance.

ALPHONS O. JAEGER.
LLOYD C. DANIELS.